United States Patent
Chu et al.

(10) Patent No.: US 6,906,883 B2
(45) Date of Patent: Jun. 14, 2005

(54) SERVO DEFECT MANAGEMENT SCHEME IN HARD DISK DRIVES

(75) Inventors: Sang Hoon Chu, Santa Clara, CA (US); Jun Seok Shim, Cupertino, CA (US); Seong Hwon Yu, San Jose, CA (US); Soo Il Choi, Santa Clara, CA (US)

(73) Assignee: Samsung Electronics Ltd., Co., Suwon (KR)

( * ) Notice: Subject to any disclaimer, the term of this patent is extended or adjusted under 35 U.S.C. 154(b) by 397 days.

(21) Appl. No.: 09/952,683

(22) Filed: Sep. 13, 2001

(65) Prior Publication Data

US 2002/0048112 A1 Apr. 25, 2002

Related U.S. Application Data

(60) Provisional application No. 60/232,649, filed on Sep. 14, 2000.

(51) Int. Cl.[7] .................................................. G11B 21/02
(52) U.S. Cl. ......................................................... 360/75
(58) Field of Search ............................ 360/89, 53, 75, 360/77.01, 77.02, 77.07, 25, 77.08; 714/48

(56) References Cited

U.S. PATENT DOCUMENTS

| | | |
|---|---|---|
| 4,371,902 A | 2/1983 | Baxter et al. |
| 4,539,662 A | 9/1985 | Hatano et al. |
| 4,802,033 A | 1/1989 | Chi |
| 4,811,135 A | 3/1989 | Janz |
| 4,823,212 A | 4/1989 | Knowles et al. |
| 4,890,172 A | 12/1989 | Watt et al. |
| 4,937,689 A | 6/1990 | Seaver et al. |
| 4,977,472 A | 12/1990 | Volz et al. |
| 4,982,295 A | 1/1991 | Yakuwa et al. |
| 5,036,408 A | 7/1991 | Leis et al. |
| 5,050,146 A | 9/1991 | Richgels et al. |
| 5,053,899 A | 10/1991 | Okawa et al. |
| 5,182,684 A | 1/1993 | Thomas et al. |
| 5,210,662 A | 5/1993 | Nishijima |
| 5,235,478 A | 8/1993 | Hoshimi et al. |
| 5,255,136 A | 10/1993 | Machado et al. |
| 5,291,110 A | 3/1994 | Andrews, Jr. et al. |
| 5,333,140 A | 7/1994 | Moraru et al. |
| 5,408,367 A | 4/1995 | Emo |
| 5,448,429 A | 9/1995 | Cribbs et al. |
| 5,450,249 A | 9/1995 | Nagaraj et al. |
| 5,452,285 A | 9/1995 | Monen |
| 5,453,887 A | 9/1995 | Negishi et al. |
| 5,465,034 A | 11/1995 | Andrews, Jr. et al. |
| 5,465,035 A | 11/1995 | Scaramuzzo, Jr. et al. |
| 5,500,776 A | 3/1996 | Smith |
| 5,523,902 A | 6/1996 | Pederson |
| 5,570,247 A | 10/1996 | Brown et al. |
| 5,581,420 A | 12/1996 | Chainer et al. |

(Continued)

FOREIGN PATENT DOCUMENTS

| | | |
|---|---|---|
| EP | 0 601 855 A2 | 6/1994 |
| EP | 0 663 766 A1 | 7/1995 |

(Continued)

*Primary Examiner*—David Hudspeth
*Assistant Examiner*—Daniell L. Negron
(74) *Attorney, Agent, or Firm*—Ben J. Yorks, Esq.; Irell & Manella LLP

(57) ABSTRACT

The present disclosure relates to a system for detecting a plurality of defect types on the surface of a disk in a hard disk drive. In particular, the disclosure relates to utilizing information obtained from a plurality of servo bits to determine if a sector contains a physical defect. Where such a defect is found, the sector's write gate is disabled and its burst signal data is ignored for track following purposes. In addition, large changes in PES are used to identify closure spike defects. Such defects are managed by providing a compensation signal to the read value of the PES to improve track following. Finally, high PES values are used to signal a third defect type where no other signs of defect are present. In such case, the sector is mapped as defective, but the burst signals continue to be used for track following purposes.

34 Claims, 11 Drawing Sheets

U.S. PATENT DOCUMENTS

| | | |
|---|---|---|
| 5,587,850 A | 12/1996 | Ton-that |
| 5,600,506 A | 2/1997 | Baum et al. |
| 5,606,469 A | 2/1997 | Kosugi et al. |
| 5,608,587 A | 3/1997 | Smith |
| 5,615,058 A | 3/1997 | Chainer et al. |
| 5,631,783 A | 5/1997 | Park |
| 5,640,423 A | 6/1997 | Archer |
| 5,657,179 A | 8/1997 | McKenzie |
| 5,659,436 A | 8/1997 | Yarmchuk et al. |
| 5,666,238 A | 9/1997 | Igari et al. |
| 5,680,270 A | 10/1997 | Nakamura |
| 5,680,451 A | 10/1997 | Betts et al. |
| 5,691,857 A | 11/1997 | Fitzpatrick et al. |
| 5,696,647 A | 12/1997 | Phan et al. |
| 5,710,677 A | 1/1998 | Teng et al. |
| 5,715,105 A | 2/1998 | Katayama et al. |
| 5,734,680 A | 3/1998 | Moore et al. |
| 5,748,677 A | 5/1998 | Kumar |
| 5,751,513 A | 5/1998 | Phan et al. |
| 5,760,992 A | 6/1998 | Phan et al. |
| 5,771,126 A | 6/1998 | Choi |
| 5,771,130 A | 6/1998 | Baker |
| 5,771,131 A | 6/1998 | Pirzadeh |
| 5,796,543 A | 8/1998 | Ton-That |
| 5,798,883 A | 8/1998 | Kim |
| 5,867,337 A | 2/1999 | Shimomura |
| 5,867,353 A | 2/1999 | Valent |
| 5,892,634 A | 4/1999 | Ito et al. |
| 5,901,009 A | 5/1999 | Sri-Jayantha et al. |
| 5,917,670 A | 6/1999 | Scaramuzzo et al. |
| 5,946,157 A | 8/1999 | Codilian et al. |
| 6,005,739 A * | 12/1999 | Yun ........................ 360/77.04 |
| 6,031,684 A | 2/2000 | Gregg |
| 6,078,460 A * | 6/2000 | Moriya ..................... 360/77.04 |
| 6,118,607 A * | 9/2000 | Jung ............................ 360/53 |
| 6,118,616 A | 9/2000 | Jeong |
| 6,178,060 B1 | 1/2001 | Liu |
| 6,388,829 B1 * | 5/2002 | Nazarian ..................... 360/48 |
| 6,611,397 B1 * | 8/2003 | Nguyen .................... 360/77.08 |

FOREIGN PATENT DOCUMENTS

| | | |
|---|---|---|
| EP | 0 717 559 A2 | 6/1996 |
| EP | 0 718 827 A2 | 6/1996 |
| GB | 2 285 165 A | 6/1995 |
| GB | 2 307 089 A | 5/1997 |
| GB | 2 308 488 A | 6/1997 |
| WO | WO 95/24035 | 9/1995 |
| WO | WO 96/23305 | 8/1996 |

* cited by examiner

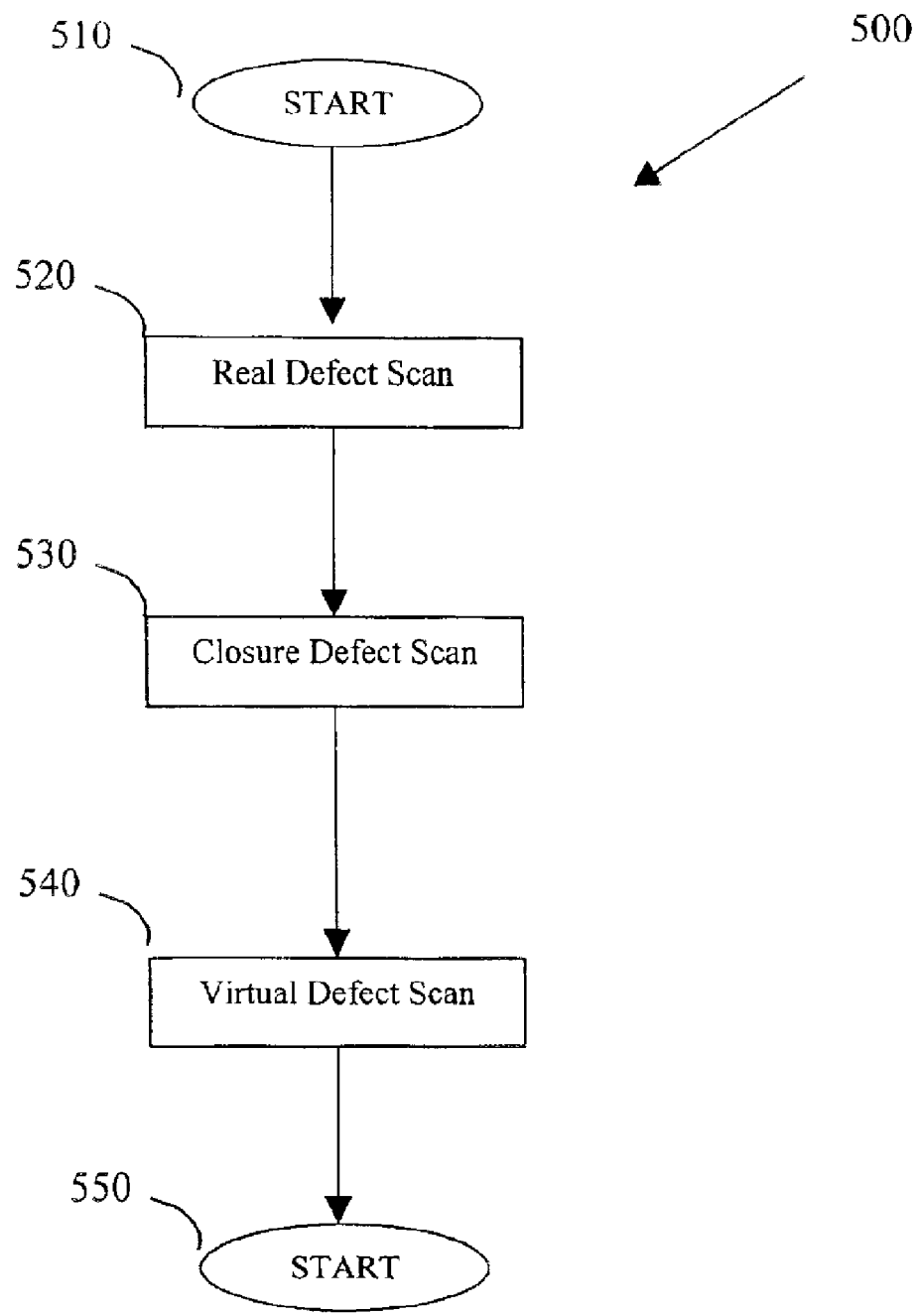

Figure 6B
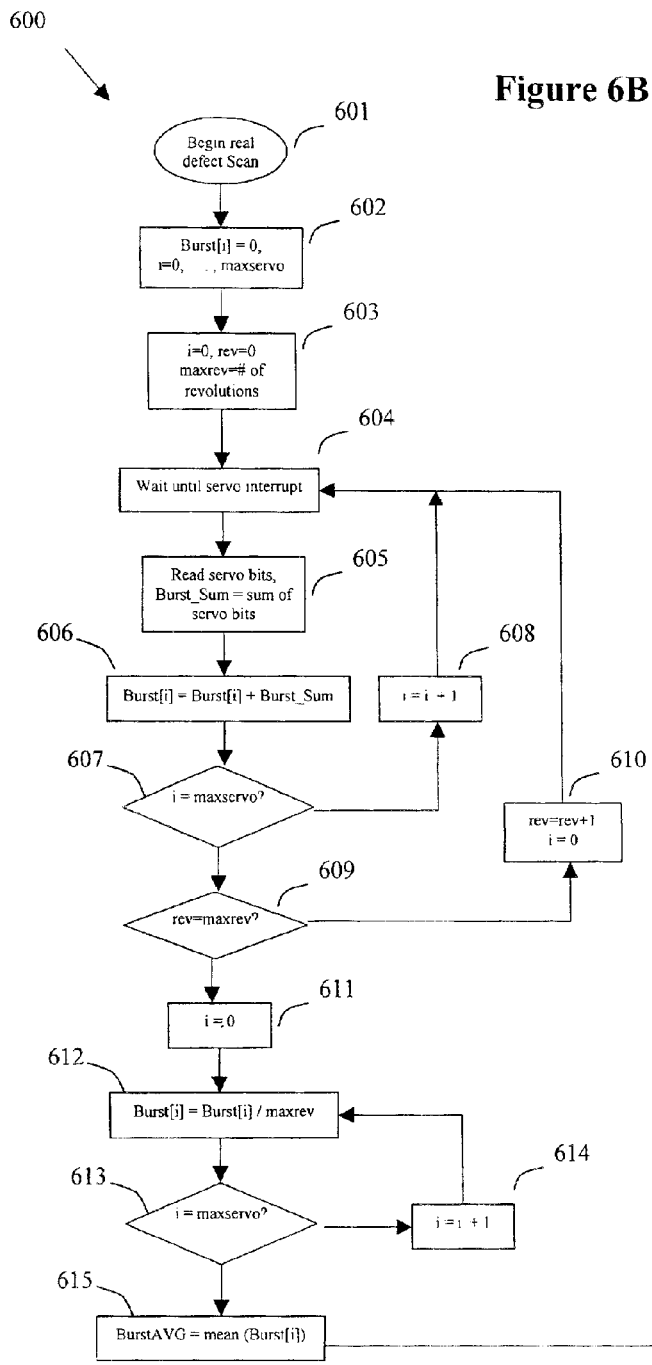
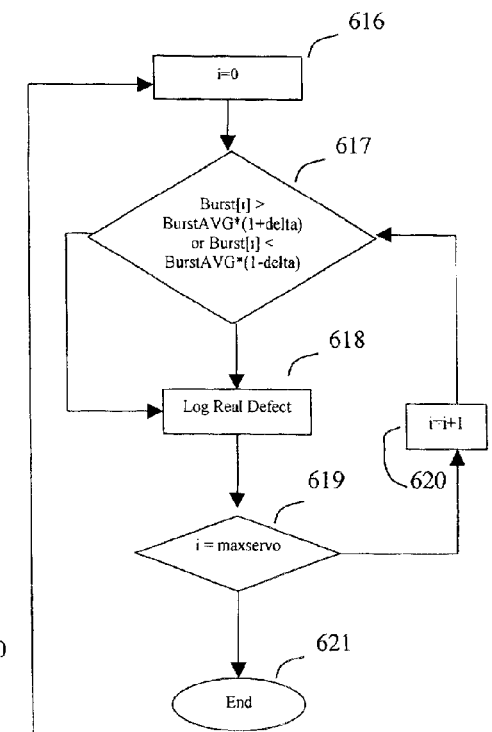

SERVO DEFECT MANAGEMENT SCHEME IN HARD DISK DRIVES

REFERENCE TO RELATED APPLICATIONS

This application is based on U.S. Provisional application No. 60/232,649, filed on Sep. 14, 2000.

BACKGROUND

1. Field of Disclosure

The following disclosure generally relates to disk drives and more particularly to a scheme for detecting defects in a hard drive assembly.

2. Description of Related Art

Disk drives are magnetic recording devices used for the storage of information. The information is typically recorded on concentric tracks on either surface of one or more magnetic recording disks. To facilitate the storage and retrieval of data in an orderly manner, disks are typically organized in blocks called sectors. These sectors are located on the disk by a set of unique identifiers called cylinder (or track), head and sector number. The disks are rotatably mounted to a spin motor and information is accessed by means of read/write heads that are mounted to actuator arms. These actuator arms are maneuvered via voice coil motors, wherein the voice coil motor is excited with a current to rotate the actuator and move the heads.

The movement of the actuator is controlled by a servo system. One well known type of servo system is referred to as a dedicated servo, wherein one area of one of the disk is dedicated to servo information. By using this servo information, the actual radial positions of the heads can be determined, and after comparison with desired head position information, control signals can be sent to the actuator arm to adjust the head position accordingly.

The servo system typically sends control signals to the actuator in accordance with a position error signal (PES) derived from the servo information. Typically, the PES has a magnitude indicative of the relative distance between the head and the center of a track and a polarity indicative of the direction of the head with respect to the track center. Additionally, the PES generally is generated by the servo system by comparing the relative signal strengths of burst signals on the disk surface. It is common during read/write operations to compare the absolute value of each PES sample to a predetermined safe-threshold value in order to verify the correct positioning of the head. It is generally known in the art that there are two situations which may give rise to a PES value which exceeds a safe-threshold value. First, it is possible that the head is misaligned to such an extent that its distant from the center of the track is sufficient to exceed this safe-threshold value. Second, it is likewise possible that a defect exists in the servo information, resulting in a misreported PES value, despite the fact that the head is positioned correctly. This latter scenario is what has led to the practice of using high PES values as an indication that there may be a defect in the servo burst area.

As is generally known in the prior art, using a high PES value to detect servo defects is a cumbersome process. This is due to the fact that the sector with the highest PES value often is not the sector which actually contains the defect. Thus, it is generally considered necessary to check several of the sectors surrounding the high PES sector before labeling any given sector as defective.

In addition to the traditional method for detecting defects being cumbersome, relying on a high PES for detecting defects may also result in mapping continuous sectors as real servo defects. Similarly, large changes in PES may be caused by errors which occurred during the servo track writing process. Whereas the term 'real servo defects' is used herein to describe physical defects in the burst pattern areas of servo sectors, the term 'closure servo defects' will be used to describe those areas exhibiting a large change in PES created by a discontinuity of the written-in servo track. It should further be appreciated that such a discontinuity may create a shock during track following, often leading to overshooting. The result of this is that several sectors after the closure defect often exhibit poor track following characteristics.

In addition to mistaking closure servo defects for real servo defects, relying simply on a high PES for mapping defects may also result in mapping virtual servo defects as real servo defects. The term 'virtual servo defect' is used to describe the situation where a sector's PES value is too high to guarantee stable writing conditions. Although the sector may not exhibit any other symptoms of damage, its write gate is typically disabled since the high PES value creates doubt as to the stability of the sector.

Accordingly, there is a need for an improved approach to detecting servo defects on a disk in a disk drive assembly which can better differentiate between the different types of defects, is less cumbersome, and more accurate.

BRIEF SUMMARY

The present disclosure relates to an apparatus, method and computer program product for detecting a plurality of defect types on a surface of a disk having a plurality of tracks, each of said tracks having a sector with a servo bit to provide a burst signal when read. The method comprises determining a position error signal for a first sector by reading a first servo bit, determining a position error signal for a second sector by reading a second servo bit, and identifying said first sector as having a first defect type where an amplitude of the burst signals for said first servo bit differs from a reference amplitude by more than a threshold amount. The method further comprises identifying a second defect type where a first rate of change of the position error signals between said first sector and second sector exceeds a predetermined rate, and identifying said first sector as having a third defect type where a fault frequency of said burst signals for said first sector is greater than a threshold frequency.

BRIEF DESCRIPTION OF DRAWINGS

FIG. 5 is a flow diagram of a system for scanning servo defects for various types of defects, according to one embodiment.

FIG. 6B is a flow diagram of a real defect scan, according to one embodiment.

DETAILED DESCRIPTION

Figure 1:
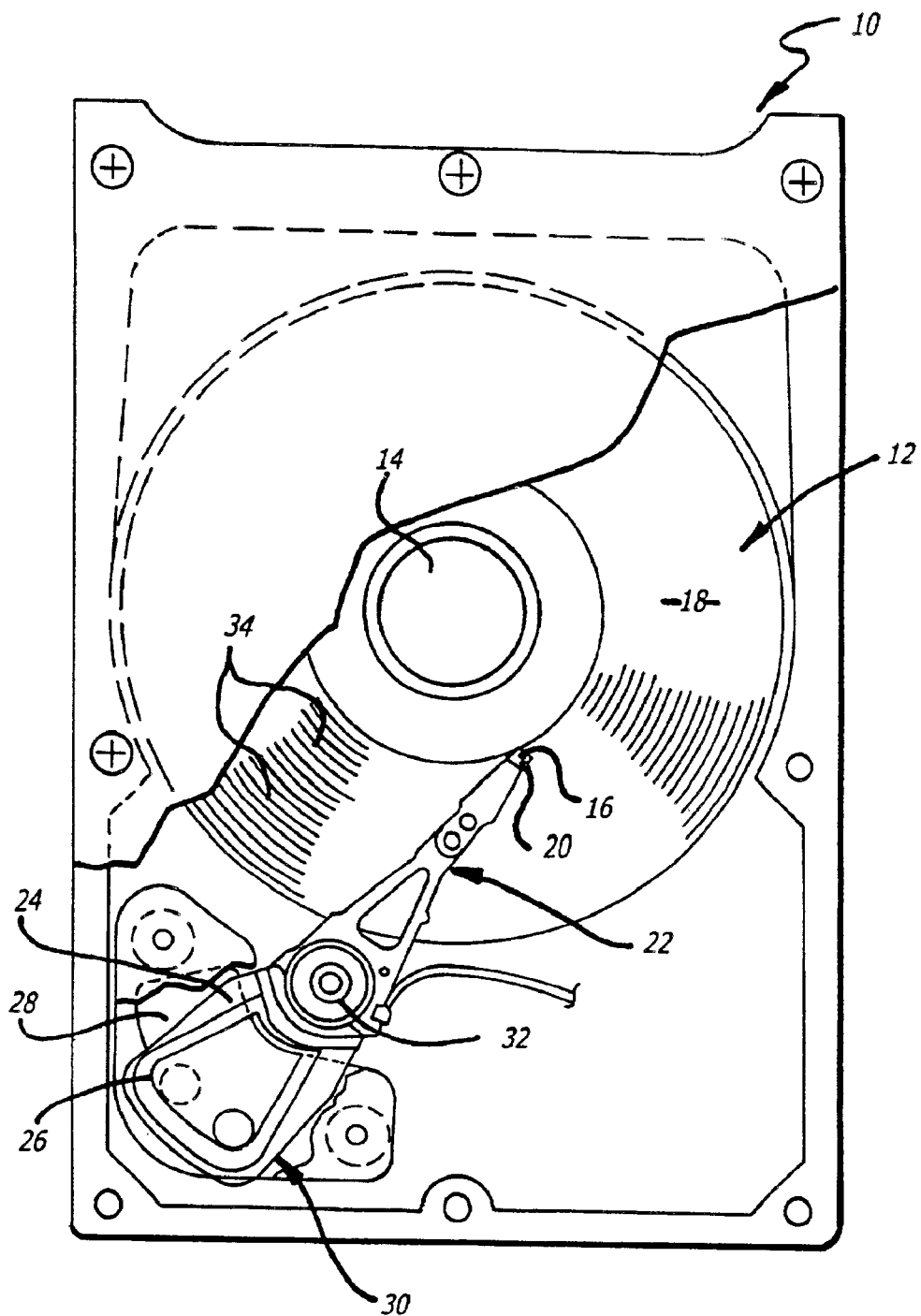
FIG. 1 is a top view of an embodiment of a hard disk drive consistent with the present disclosure.

In general, the present disclosure provides a defect detection system under which real servo defects, virtual servo defects and closure servo defects are detected and processed.

One aspect of the disclosure is to utilize information obtained from a plurality of servo bits to determine if the sector in which these servo bits are located contains a physical defect, generally referred to herein as a real servo defect. Such a defect may be in the form of a manufacturer's defect or a subsequent scratch. By measuring the amplitude of the servo bit signals for a given sector, it is possible to determine whether the given sector contains a defect by comparing these burst signals to the burst signals of other sectors. Where the burst signals of a given sector exceed some threshold, the sector's write gate is disabled and its burst signal data is ignored for track following purposes. The manner of detecting and managing a real servo defect may be as disclosed in U.S. Application Ser. No. 09/952,682, entitled "METHOD AND APPARATUS TO DETECT AND MANAGE SERVO SECTORS WITH DEFECT ON SERVO PATTERN AREA IN HARD DISK DRIVES" filed on Sep. 13, 2001, which has been assigned to the assignee hereof, and which is hereby fully incorporated by reference.

Another aspect of the present disclosure relates to the detection and management of defects in sectors where a large change in PES is created by the discontinuity of the written-in servo track. As mentioned previously, such closure servo defects exhibiting PES discontinuities may be caused by errors during the track writing process. In one embodiment, the value of this discontinuity is used to determine how likely it is that the occurrence of the high PES is caused by a closure spike problem rather than a real servo defect. Where the value of the discontinuity exceeds some threshold value, a compensation signal is added to the read value of the PES to improve track following. The manner of detection and management of closure servo defects may be as set forth in U.S. Application Ser. No. 09/952,684, entitled "METHOD AND APPARATUS FOR PROVIDING POSITIONAL INFORMATION ON A DISK" filed on Sep. 13, 2001, which has been assigned to the assignee hereof, and which is hereby incorporated fully by reference.

A third aspect of the present disclosure seeks to identify and manage sectors exhibiting a high PES value, thereby signaling a potential problem with write stability, but which otherwise show no other signs of physical defects. Such defects, referred to herein as virtual servo defects, may be caused, for example, by spindle Non-Repeatable Run out resonance. For such defects, one embodiment of the present disclosure seeks to use a measure the write fault frequency to determine if the sector's write gate should be disabled. Where a certain write fault frequency is obtained, the sector's write gate is disabled. However, even where the sector is mapped as defective as a virtual servo defect, the burst signals are still used for track following purposes.

Referring to the drawings more particularly by reference numbers, FIG. 1 shows an embodiment of a hard disk drive 10. The drive 10 includes at least one magnetic disk 12 that is rotated by a spindle motor 14. The drive 10 may also include a transducer 16 located adjacent to a disk surface 18.

The transducer 16 can write and read information on the rotating disk 12 by magnetizing and sensing the magnetic field of the disk 12, respectively. There is typically a transducer 16 associated with each disk surface 18. Although a single transducer 16 is shown and described, it is to be understood that there may be a write transducer for magnetizing the disk 12 and a separate read transducer for sensing the magnetic field of the disk 12. The read transducer may be constructed from a magneto-resistive (MR) material. Some heads contain a magneto-resistive (MR) material that is used to sense the magnetic field of the disks. The resistance of the magneto-resistive material will vary linearly with variations in the magnetic field. The magneto-resistive material is coupled to a current source. Variations in the magnetic field of the disk will cause a corresponding change in the magneto-resistive resistance and the voltage sensed across the magneto-resistive element. MR heads typically have a higher bit density than other types of disk drive heads The transducer 16 can be integrated into a slider 20. The slider 20 may be constructed to create an air bearing between the transducer 16 and the disk surface 18. The slider 20 may be incorporated into a head gimbal assembly (HGA) 22. The HGA 22 may be attached to an actuator arm 24 which has a voice coil 26. The voice coil 26 may be located adjacent to a magnet assembly 28 to define a voice coil motor (VCM) 30. Providing a current to the voice coil 26 will generate a torque that rotates the actuator arm 24 about a bearing assembly 32. Rotation of the actuator arm 24 will move the transducer 16 across the disk surface 18.

Information is typically stored within annular tracks 34 of the disk 12. Each track 34 typically contains a plurality of sectors. Each sector may include a data field and an identification field. The identification field may contain Gray code information which identifies the sector and track (cylinder). The transducer 16 is moved across the disk surface 18 to write or read information on a different track. Moving the transducer to access a different track is commonly referred to as a seek routine.

Figure 2:
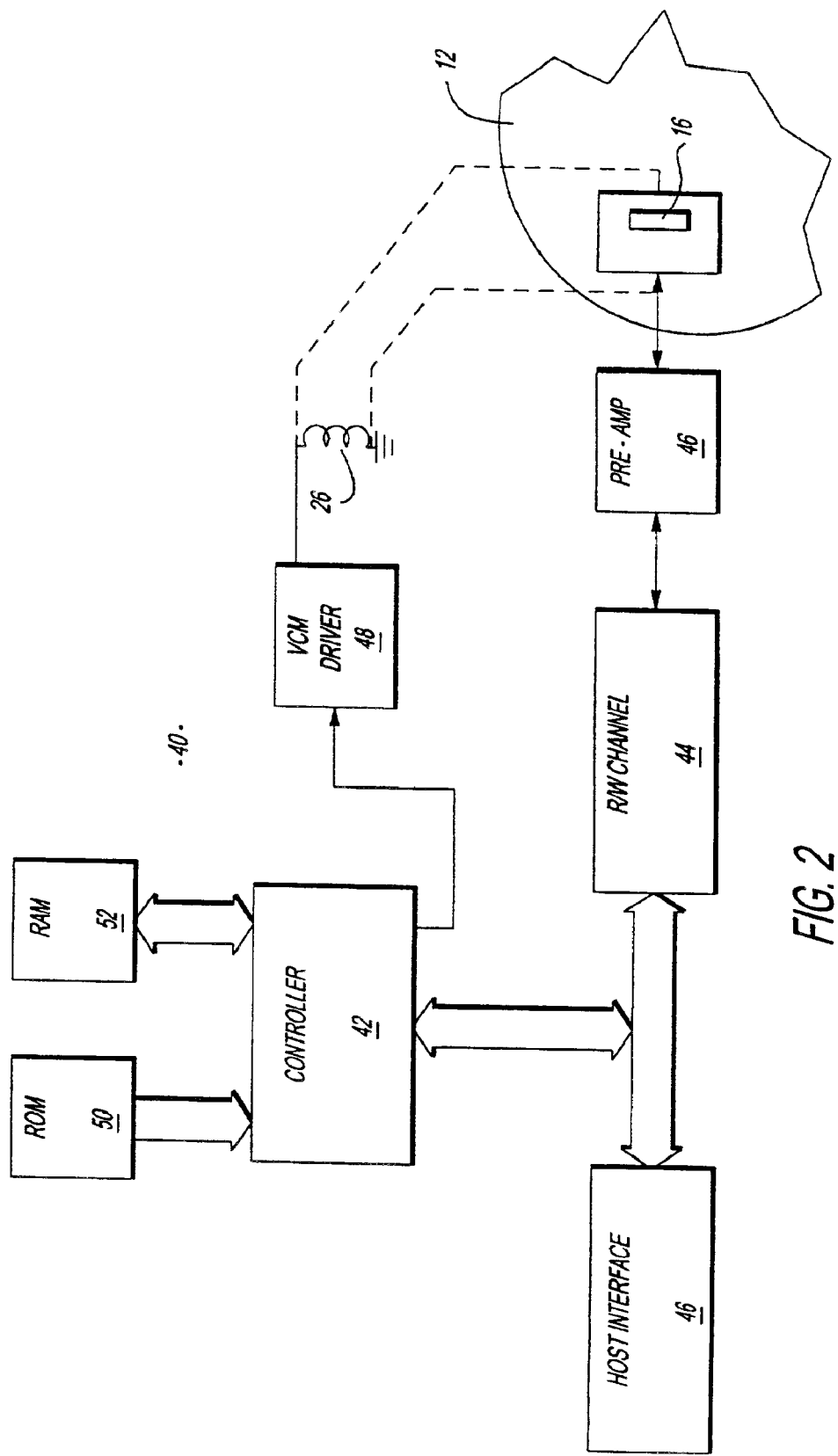
FIG. 2 is a schematic of an electrical system which controls the hard disk drive of FIG. 1.

FIG. 2 shows an electrical system 40 which can control the hard disk drive 10. The system 40 may include a controller 42 that is coupled to the transducer 16 by a read/write (R/W) channel circuit 44 and a pre-amplifier circuit 46. The controller 42 may be a digital signal processor (DSP), microprocessor, microcontroller, and the like. The controller 42 can provide control signals to the read/write channel 44 to read from the disk 12 or write information to the disk 12. The information is typically transferred from the R/W channel 44 to a host interface circuit 46. The host circuit 46 may include buffer memory and control circuitry which allow the disk drive to interface with a system such as a personal computer.

The controller 42 may also be coupled to a VCM driver circuit 48 which provides a driving current to the voice coil 26. The controller 42 may provide control signals to the driver circuit 48 to control the excitation of the VCM and the movement of the transducer 16.

The controller 42 may be connected to a non-volatile memory such as a read only memory (ROM) or flash memory device 50, and a random access memory (RAM) device 52. The memory devices 50 and 52 may contain instructions and data that are used by the controller 42 to perform software routines. One of the software routines may be a seek routine to move the transducer 16 from one track to another track. The seek routine may include a servo control routine to insure that the transducer 16 moves to the correct track. In one embodiment, the memory device 50 contains the acceleration, velocity, and position trajectory equations of the present disclosure, as discussed herein below, where such equations may be loaded into memory device 52 at startup.

Figure 3:
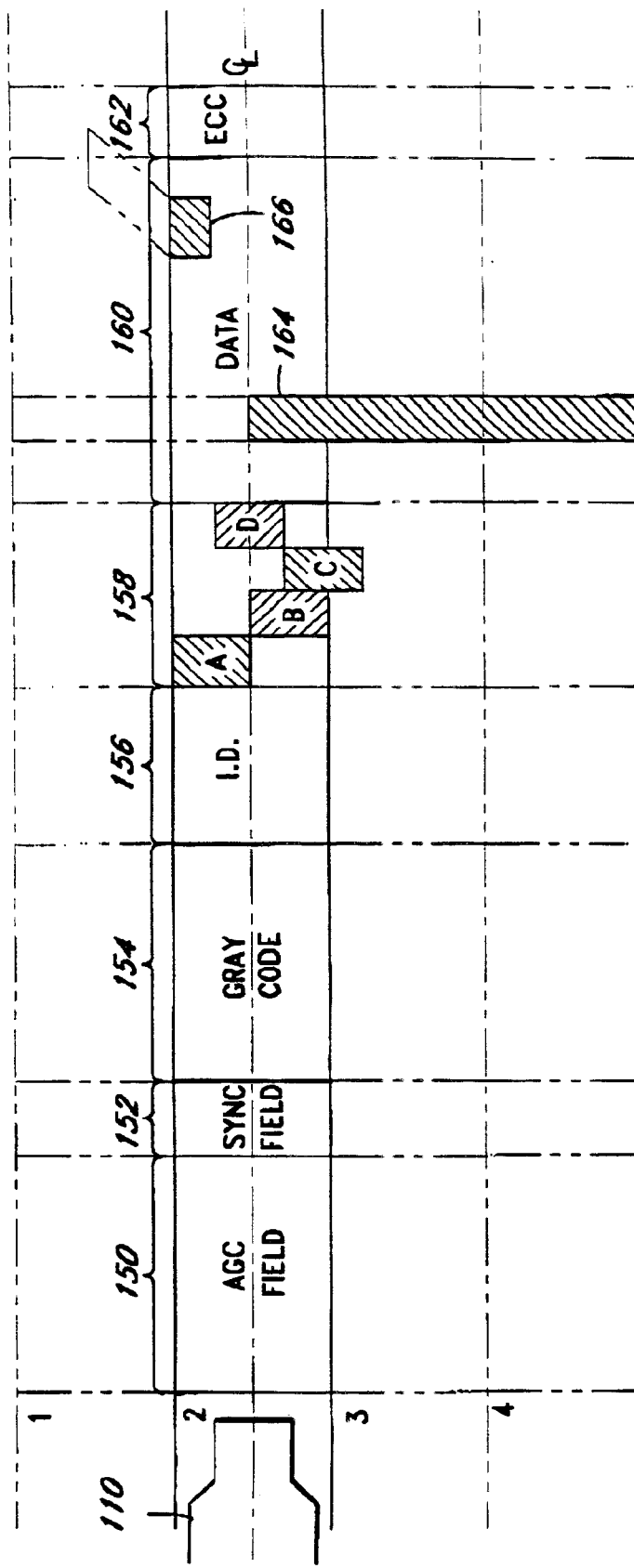
FIG. 3 illustrates the layout of a typical sector of the disk in a hard disk drive.

As shown in FIG. 3, data is typically stored within sectors of radially concentric tracks located across disk 12. A typical sector will have an automatic gain control (AGC) field 150, a synchronization (sync) field 152, a gray code field 154 that identifies the track, an identification (ID) field 156 that defines the sector, a servo field 158 which includes a number of servo bits A, B, C, D, a data field 160 which contains data and an error correction field 162. In operation, the head 110 is moved to a track and the servo information provided in servo field 158 is read and provided to the electrical system 40.

Figure 4:
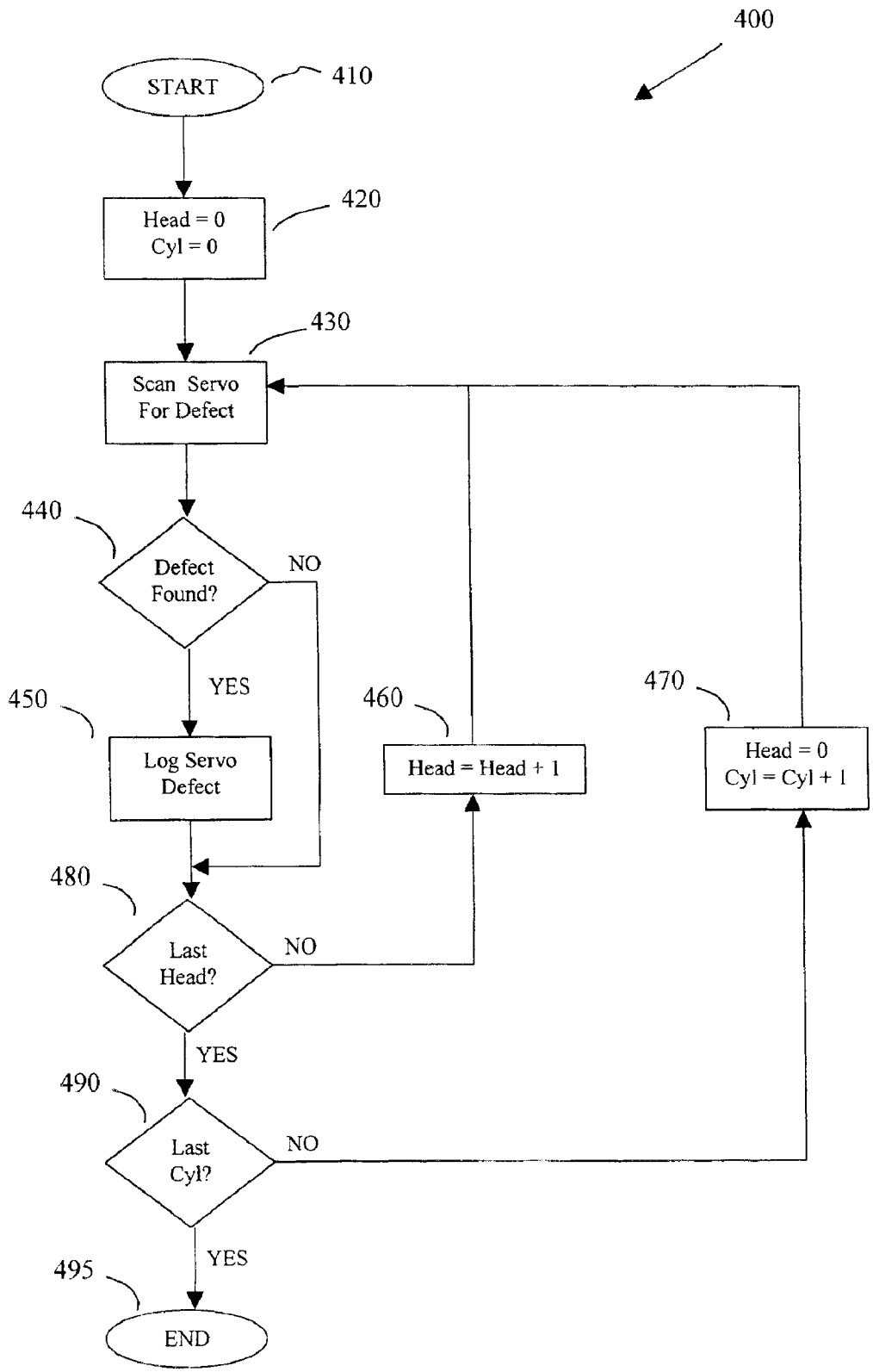
FIG. 4 is a flow diagram of a servo defect scan according to one embodiment.

Referring to FIG. 4, the scan process 400, according to one embodiment, scans the heads of a disk, one cylinder at a time. From a starting position (block 420), the scan process 400 scans for a defect (block 430) and logs defects it finds at block 440. At block 480, the scan process 400 determines if the last head in the current cylinder has been reached. If not, the scan process 400 moves to the next head (block 460) and continues scanning at block 430. If, however, the last head in the present cylinder is reached, the scan process 400 moves to the next cylinder and resets the head counter (block 470). This scan process 400 may continue until all of the heads in all of the cylinders have been read, or a preset number of heads and cylinders may be read.

Referring now to FIG. 5, which depicts a multi-defect scan process 500. Multi-defect scan process 500 may begin by executing a scan for real servo defects (block 520). Thereafter, multi-defect scan process 500 performs a closure defect scan at block 530 in one embodiment. Finally, at block 540, multi-defect scan process 500 may perform a virtual defect scan. A real defect scan, closure defect scan and virtual defect scan, according to one embodiment, are described in further detail below.

As discussed above, one aspect of the present disclosure is to scan for and manage real servo defects. In general terms, real servo defects in a given sector, such as defects 164 or 166, are detected by comparing some measure of the magnitude of the burst signals of the servo bits A, B, C, and D for the given sector to some reference value. This real defect detection may occur in a defect scan system such as in multi-defect scan system 500 at block 520. In one embodiment, this burst signal measure is the sum of the burst signals for the servo bits A, B, C, and D. While summing the burst signals of the servo bit to get the burst signal measure is one embodiment, it should be appreciated that other methods of calculating a burst signal measure may be used. For example, the burst signal measure may be the measure of one of the servo bits or may be the average of the servo bits.

It should further be appreciated that it may be desirable to read the burst signals for a given sector more than once. This may be done, for example, to improve the accuracy of the measured bust signal magnitudes. When more than one reading is taken, according to one embodiment, the average burst signal for the given sector or sectors may be obtained by dividing the sum of the burst signals for this given sector or sectors by the number of times those servo bits were read.

Once a burst signal measure is obtained, one aspect of the present disclosure is to compare it to a reference value to determine if it differs from the reference value by more than a threshold amount. In one embodiment this amount is 30 percent. In other embodiments, this amount may be higher or lower. If the burst signal measure for a particular sector differs from the reference value by more than the threshold amount, the sector may be mapped as defective. In addition to mapping the given sector as defective, the write gate for the defective sector may also be disabled.

In one embodiment, the reference value is a function of the burst signal measures for a representative sample of sectors on the disk. It should be appreciated that this representative sample may be comprised of more than one sector along a single concentric track on a disk, or alternatively, may be comprised of a number of sectors on different tracks on the disk.

Figure 6A:
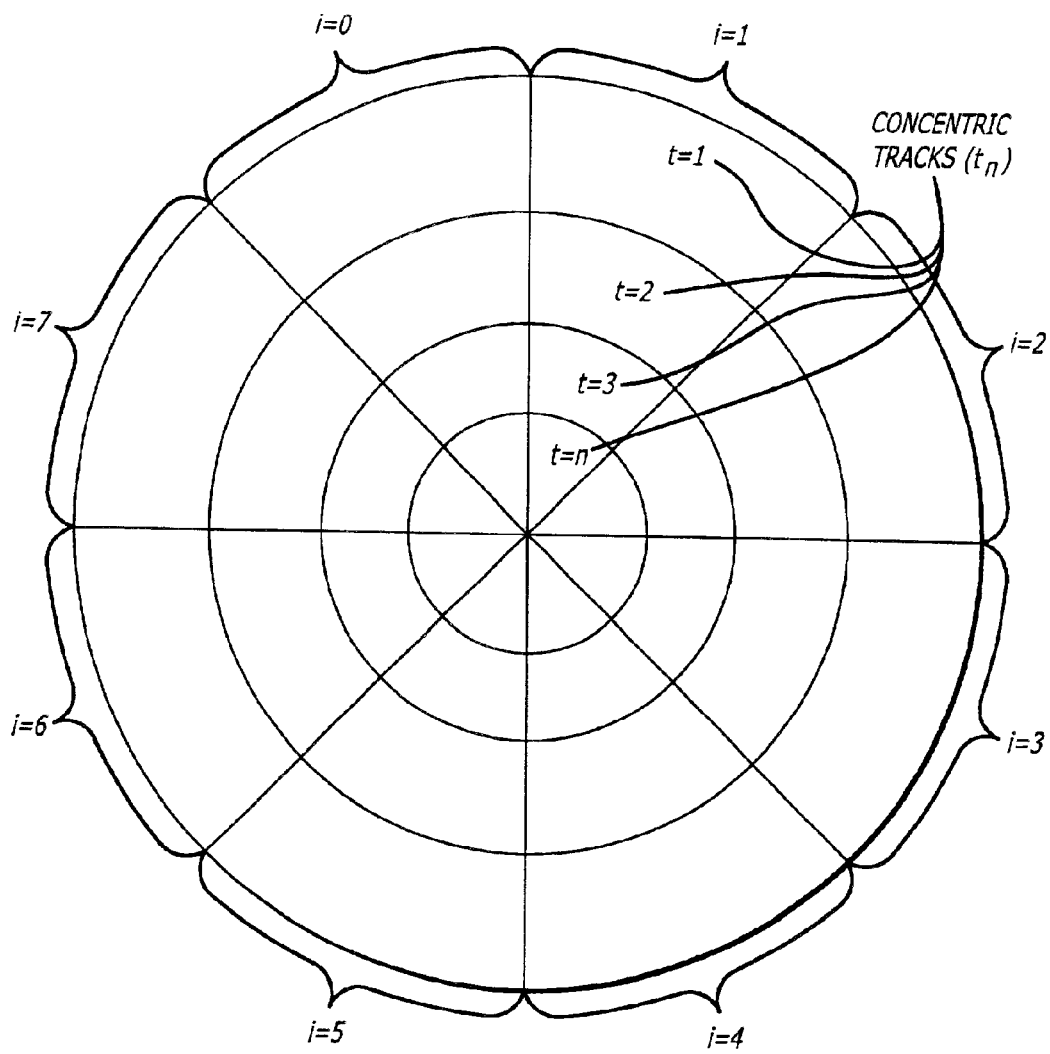
FIG. 6A provides a simplified layout of the surface of a disk.

FIG. 6A is an exemplary map of a disk to be scanned in accordance with one aspect of the present disclosure. FIG. 6B illustrates an exemplary process 600 for detecting real servo defects, according to one embodiment. Referring in particular to FIG. 6B, the process 600 commences at block 601 for a given concentric track $t_n$. The process 600 begins by initializing a table of i entries to zero, where the i entries in the table for Burst[i] represent the magnitudes of the servo bit burst signals for a given sector i. In one embodiment there are four burst signals in each servo sector corresponding to the four servo bits. In addition, the variable i ranges from zero to some variable maxservo, where, according to one embodiment, the variable maxservo represents the number of servo sectors in a given concentric track $t_n$ of the disk. By way of a non-limiting example, in FIG. 6A the variable maxservo is set to 7. Thus, in this embodiment each revolution of the disk has the transducer 16 reading eight servo sectors i, with i ranging from 0 to 7. It should be appreciated, however, that the sectors i may be located on different concentric tracks $t_n$ of the disk.

Continuing to refer to FIGS. 6A and 6B, at block 605 the process 600 proceeds with measuring the magnitude of the servo bit burst signals for the sector i. This value is stored in variable Burst_Sum. The value in Burst_Sum is then added to the variable Burst[i] at block 606. Thus, after the first sector is read, Burst[i] will be equal to Burst_Sum since Burst[i] was initially set to zero.

At block 607, the process 600 continues by checking to see if i has reached maxservo. If not, then at block 608 the variable i is increased by 1 and Burst_Sum is read for the next set of servo bits in the next sector (i=1). This loop continues until all sectors have been read for one revolution, or concentric track $t_n$, and values for Burst[$i_{0-7}$] have been obtained. Alternatively, the loop may continue until all the chosen sectors across a plurality of tracks have been read.

At block 609, process 600 determines if rev has reached maxrev, where maxrev is some predetermined number of revolutions. Maxrev also represents the number of times the burst signals in a sector are read. The burst signals in a sector may be read more than once to validate the magnitude of the burst signals in a given sector. This may help to eliminate potential misreads that may otherwise occur. In one embodiment, maxrev equals 8. If rev is less than maxrev, then process 600 sets i=0 at block 610 and loops back to block 204 for the next revolution. As with the previous revolution, the next revolution determines the magnitude of the servo bit burst signal, Burst_Sum, for each servo sector from i=0 to i=maxservo. The variable Burst[i] represents the cumulative magnitude of the servo bit burst signal for a given sector i through all revolutions completed.

Once this predetermined number of revolutions maxrev has been completed, process 600 sets i=0 and proceeds to block 612 where each entry in the table of Burst[i] is normalized for each sector read by dividing it by the number of revolutions completed, maxrev. Loop 612–614 continues until the variable Burst[i] for each sector has been normalized.

Once each of the magnitudes of the burst signals in the i sector have been normalized, the mean burst signal, BurstAVG, of all sectors i is computed at block 615. Thus, for in the current example of FIG. 6A, the burst signals for the eight sector (i=0–7) are added and then divided by eight to yield the BurstAVG. This mean burst signal is then compared to the magnitude of the normalized burst signals for each sector i at block 617. If Burst[i] for sector i differs from BurstAVG by some predetermined amount delta, a servo defect is logged for that sector i (see blocks 616–620). Blocks 617–620 proceeds through all the sectors $i_{0-maxservo}$, each time measuring the difference between the normalized burst signal, Burst[i], for the sector i against the average burst signal, BurstAVG, for all sectors.

It should be appreciated that process 600 can be performed for any number of concentric tracks on a given disk from t=1 to t=n. It should further be appreciated that Burst[i] may be normalized for a given concentric track $t_n$ as described herein, or may be normalized against burst signals in various concentric tracks $t_1$–$t_n$. Similarly, BurstAVG may be the mean for the burst signals in a given concentric track $t_n$, or it may represent the mean for the burst signals across a number of tracks $t_1$–$t_n$.

Figure 7:
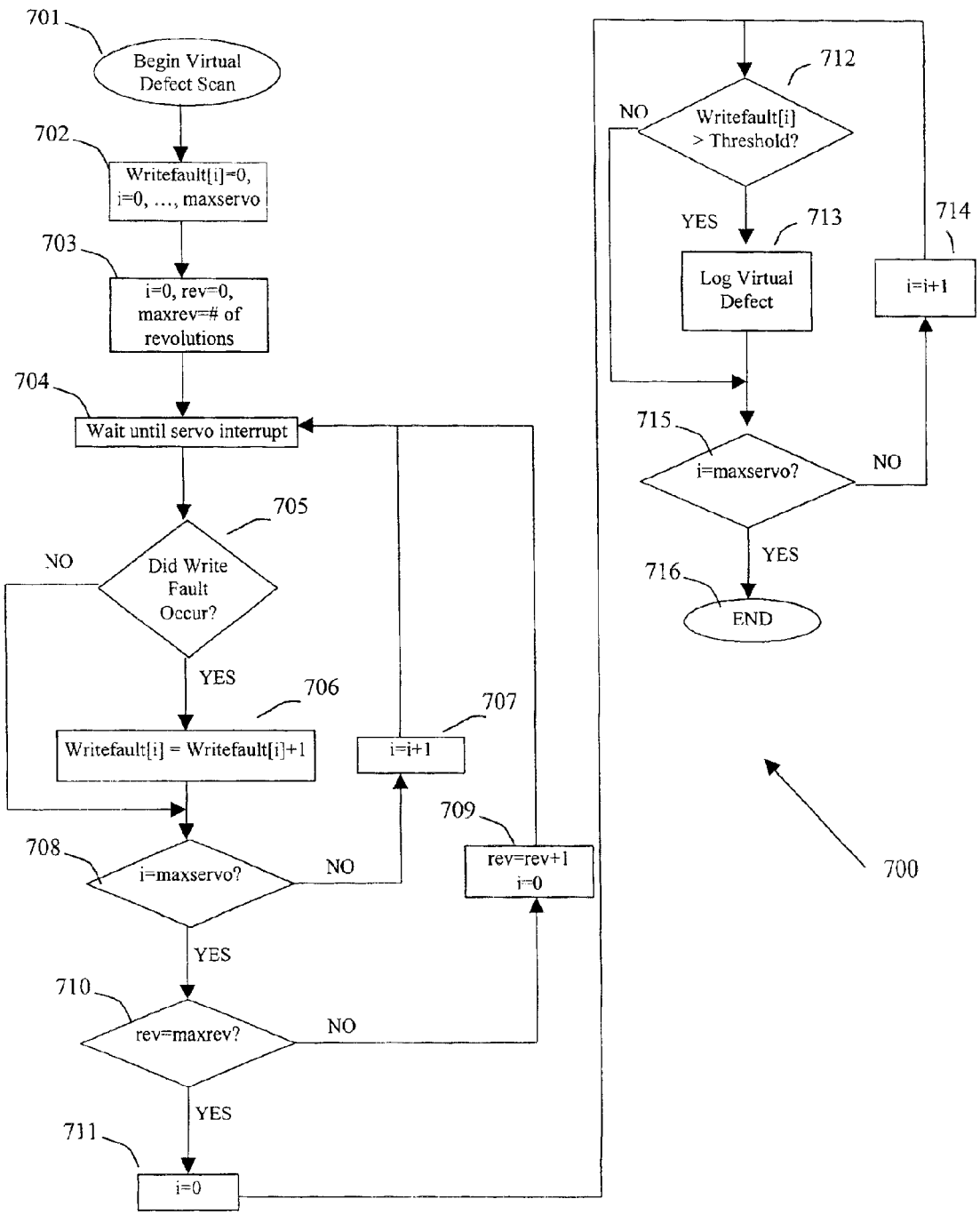
FIG. 7 is a flow diagram of a virtual defect scan in one embodiment.

Another aspect of the disclosure relates to the detection and management of virtual servo defects. As discussed previously, virtual servo defects refer to the occurrence of a high PES value in a given sector, thus signaling a potential problem with write stability, but where no other signs of physical defects are present. Virtual servo defects may be caused by Non-Repeatable Runout. In particular, disk drive motor bearing dynamics determine the precision of the spindle rotation. Where the spin-axis motion has a component that is in phase and at the same frequency as the spindle rotation, Repeatable Runout may occur. However, there is also a component of spin-axis motion that is random. This component is Non-Repeatable Runout. FIG. 7 is a flow diagram of a process 700 for detecting such defects, according to one embodiment.

Referring to FIG. 7, process 700 begins at block 701 by initializing a table of i entries to zero, where the i entries in a table for writefault[i] represent a true/false value for whether or not a write fault was detected for a given sector i. While comparing the PES recorded for a given sector to the write bump limit is one way to identify a write fault, it should be appreciated that other methods of identifying write faults are known to those skilled in the art and may be used in place of the write bump limit. By way of a non-limiting example, the write fault limit (i.e., the threshold value above which a write fault is logged) may be set to some incremental value below the write bump limit to insure safe writing conditions.

As the with real servo defect scan process 600, in process 700 the variable i ranges from zero to some maxservo, where maxservo represents, according to one embodiment, the number of servo sectors in a given concentric track $t_n$ of the disk. In one embodiment, the variable maxservo may be set to 7 (see FIG. 6A). Thus, in this embodiment, each revolution of the disk has the transducer 16 reading eight servo sectors i, with i ranging from 0 to 7. It should also be appreciated that sectors i may be located on different tracks $t_n$ of the disk.

At block 703, the variables i and rev are initialized to zero, where rev is the number of the current revolution of process 700. In addition, at block 703, the variable maxrev is set to some predetermined value which represents the number of times each sector is to be scanned for a write fault. In one embodiment, maxrev is set to 8.

At block 705, process 700 scans sector i for a possible write fault. As discussed above, a write fault is recorded where a specific write fault condition is met. In one embodiment, this write fault condition is met where the PES value for sector i exceeds some reference value, where the reference value is a function of the write bump limit.

If a write fault is detected for sector i, writefault[i] is incrementally increased at decision block 706 to reflect the fact a write default has been detected for sector i. If, on the other hand, no write fault is detected, the process 700 skips to decision block 708. At block 708, the process 700 determines whether or not the last sector for the current revolution has been reached. If i equals maxservo, process 700 proceeds to decision block 710. If, however, i is still less than maxservo, i is incrementally increased to the next sector. Loop 704–708 of process 700 continues until the last sector of the current revolution has been scanned for a write fault.

At decision block 710, a determination is made as to whether or not the process 700 has completed the predetermined number of revolutions maxrev. By way of a non-limiting example, maxrev may be 8. Thus, in this embodiment, if 8 revolutions have not been made, process 700 increases the variable rev by 1 and sets the variable i to zero. Then, the process 700 cycles through the sectors i=0 to i=maxservo. This continues until each sector i has been read maxrev times and each time a write fault was encountered, writefault[i] was increased accordingly.

Once all of the write fault occurrences are recorded, process 700 sets i back to zero (block 711) and tests each sector i to see if the number of times a write fault was detected (which is now stored in variable writefault[i]) exceeds some predetermined threshold. In one embodiment, the threshold variable is 5. In this embodiment, a sector i will be mapped and logged as a virtual servo defect if, of the 8 times it is scanned, a write fault is detected more than 5 times. Process 700 continues this comparison for each sector from i=0 to i=maxservo.

In another embodiment, a write fault frequency is determined, where the write fault frequency for a given sector i is the ratio of the number of times a write fault was detected for a given sector to the total number of times the sector was scanned. This ratio may then be compared to a threshold ratio. Where the write fault frequency exceeds the threshold ratio, which in one embodiment is 0.625, the given sector i is mapped and logged as a virtual servo defect.

In one embodiment, logging a sector i as having a virtual defect includes disabling its write gate. However, with a virtual servo defect, the burst information may be used for track following purposes. By definition a virtual defect exhibits no other defect symptoms other than an unacceptable write fault frequency. Thus, instead of simply mapping the sector as defective and ignoring its information, one aspect of the disclosure uses the burst signals of a virtual defect sector to improve positioning and track following stability.

Another aspect of the present disclosure relates to the detection and management of closure servo defects which are defects exhibiting a large change in PES due to the discontinuity of the written-in servo track. In one embodiment, the value of this discontinuity is used to determine how likely it is that the occurrence of the high PES is caused by a closure spike problem rather than a real servo defect. Where the value of the discontinuity exceeds some threshold value, a compensation signal is added to the read value of PES to generate a continuous PES for to allow more stable track following. In one embodiment, the threshold value is 6% of the track pitch. The effects of utilizing such a compensation signal are described in more detail below.

Figure 8:
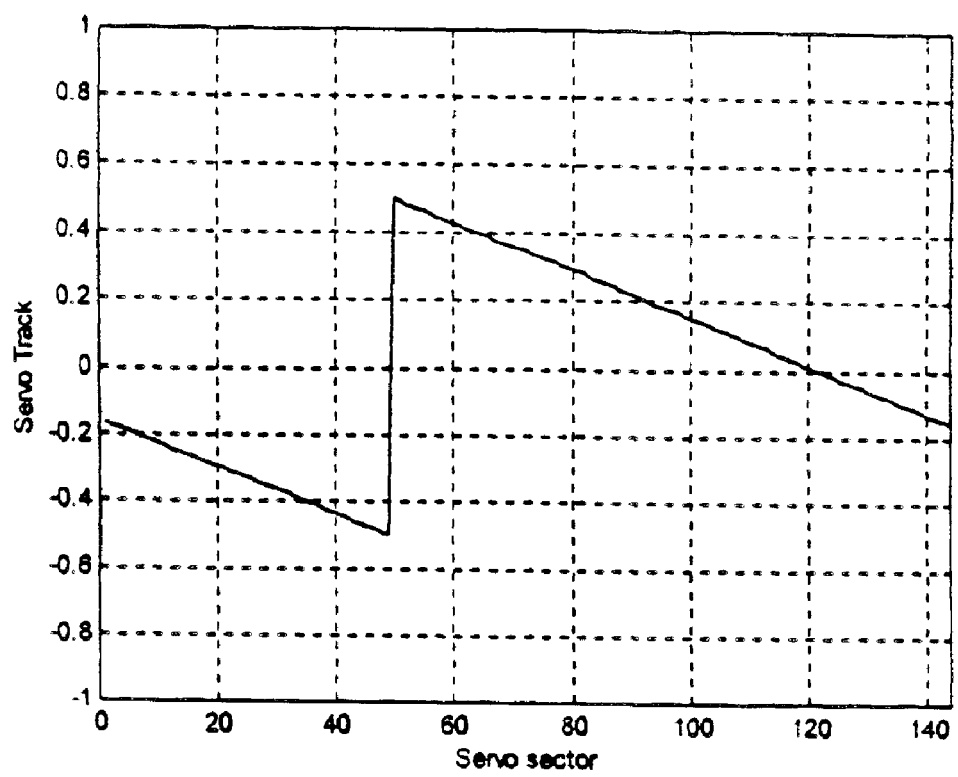
FIG. 8 is a graphical representation of a closure servo defect.

Referring to FIG. 8, suppose a discontinuity of 1 (−0.5 to 0.5) is found at servo sector 50. Such a dramatic change in PES may be caused, for example, by an error in the written-in servo track. In our previous example of using a 6% track pitch threshold value, the PES change in FIG. 8 clearly meets this criteria. In such a case, a compensation signal may be added to it to produce a more continuous and readable signal for improved positioning. The compensation signal may be stored in the data field 160 or the error correction field 162 of the sector which is to have its PES value compensated. Alternatively, the data field 160 or the error correction field 162 of an adjacent sector may be used. Similarly, a reference compensation signal may be used, where the reference compensation signal is part of a servo routine to be carried out by controller 42. It should further be appreciated that it may be obvious to one skilled in the art to store the compensation signal in other locations, including other non-adjacent sectors.

Figure 9:
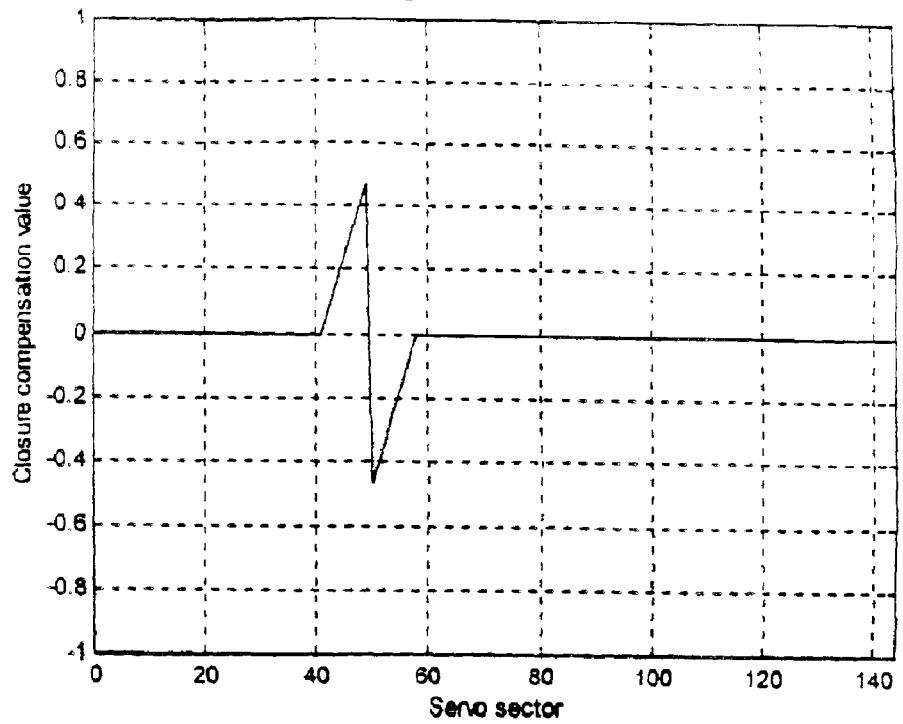
FIG. 9 is a graphical representation of a closure defect compensation signal, according to one embodiment.
Figure 10:
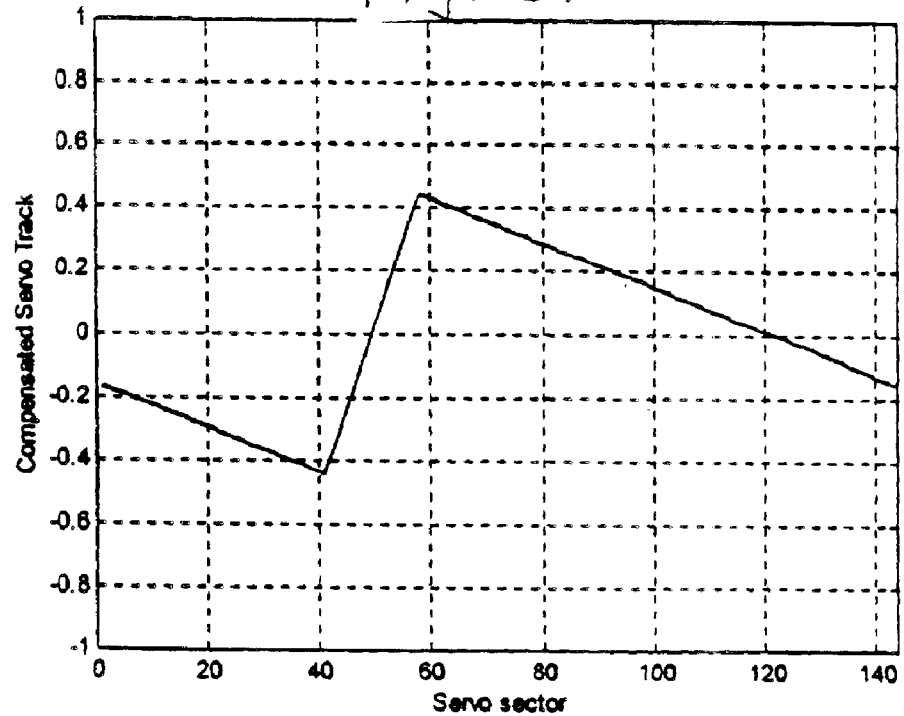
FIG. 10 is a graphical representation of the resulting signal after the signal of FIG. 10 is a to the signal of FIG. 9.

By way of a non-limiting example, one such compensation signal is illustrated in FIG. 9. Adding the signal of FIG. 8 to that of FIG. 9, yields the smoother PES signal of FIG. 10. Moreover, in addition to improving track following through the addition of a compensation signal, the smoother resulting PES makes it possible to not have to disable the write gate for sectors having closure defects.

Figure 11:
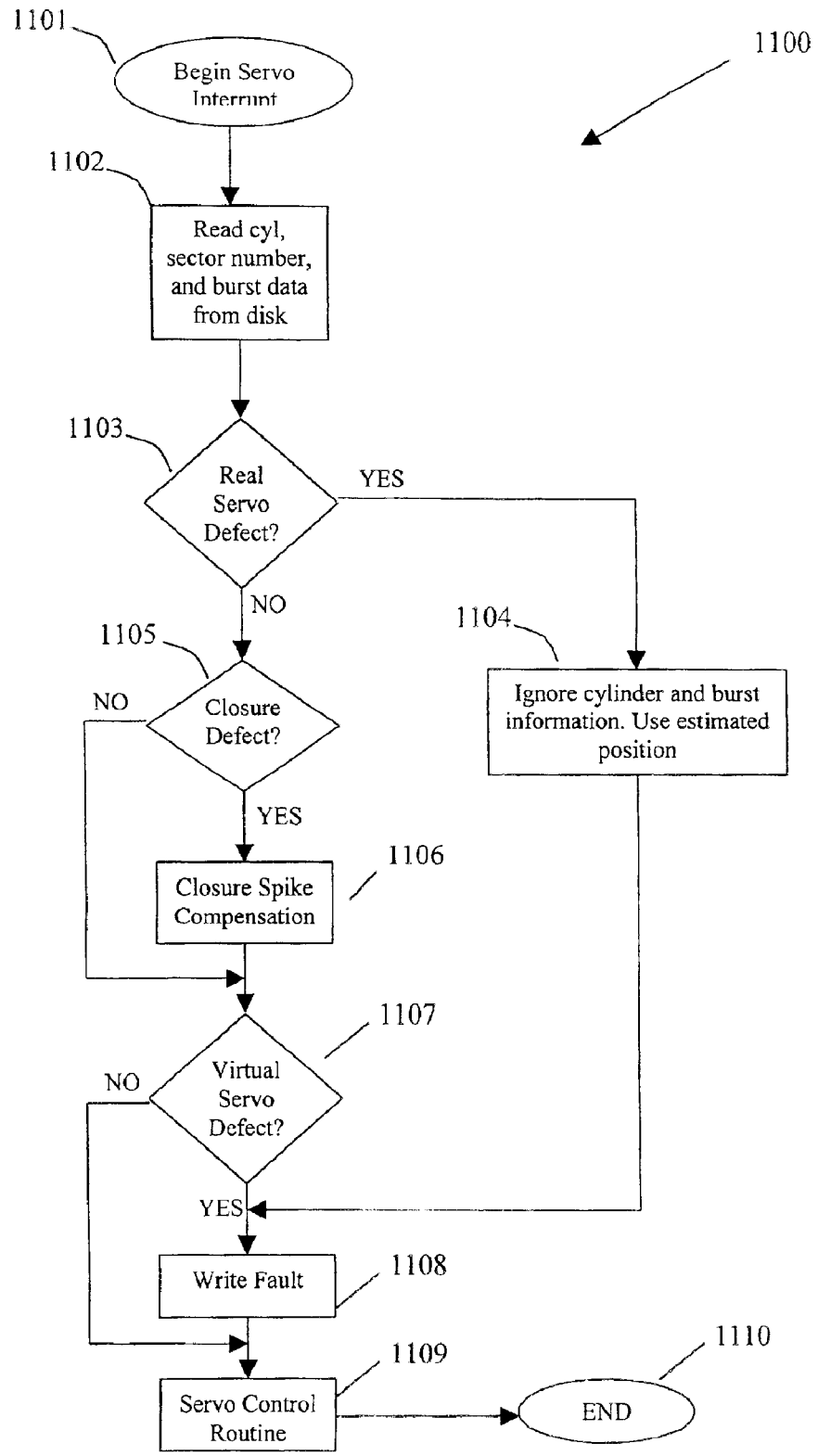
FIG. 11 is a flow diagram of a system for scanning for defects, according to one embodiment.

Referring now to FIG. 11 which illustrates another embodiment. In multi-defect scan process 1100, a given sector is analyzed for the occurrence of real servo defects, closure servo defects and virtual servo defects, according to one embodiment. At block 1102, the cylinder, sector number and corresponding burst information for a given sector is read. Thereafter, a determination as to whether a real servo defect is present is made at block 1103. In one embodiment, such a determination is made by executing process 600. Where a real servo defect is detected, the position information provided by the burst data of the given sector is ignored. Rather, an estimated position is used for track following purposes, according to one embodiment. Estimated position may, for example, be based on a linear interpolation analysis of the surrounding sectors which do not exhibit real servo defect characteristics. Moreover, in one embodiment the write gate is disabled for sectors mapped as having real servo defects.

If, on the other hand, a real servo defect is not detected for the given sector, multi-defect scan process 1100 proceeds to decision block 1105 where a determination is made as to whether a closure servo defect is present. Where a closure servo defect is in fact detected for the given sector, a compensation signal may be added according to the method described above and illustrated in FIGS. 8 through 10 (block 1106). It should further be noted that the write gate for sectors exhibiting closure servo defects is not disabled since the compensation signal alleviates problems related to the discontinuity in PES. Moreover, unlike the embodiment in which burst data is ignored for sectors having real servo defects, the burst data for sectors with closure servo defects may still be used for servo control and positioning purposes.

Thereafter, a determination is made as to whether a virtual servo defect is present in the given sector (block 1107). Where a positive determination is made at decision block 1107, the write gate for the given sector may be disabled as previously described. However, as with closure servo defects, burst data for sectors having virtual servo defects may still be used for servo control purposes.

The subject matter described herein may be implemented as a method, apparatus, system, etc. When implemented in software, the elements of the disclosure are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc.

Although the applicant's disclosure has been described in terms of certain preferred embodiments, other embodiments apparent to those of ordinary skill in the art are also within the scope of this disclosure. Accordingly, the scope of the invention is intended to be defined only by the claims which follow.

What is claimed is:

1. A method of detecting a plurality of defect types on a surface of a disk having a plurality of tracks, each track having a sector with a servo bit to provide a burst signal when read, comprising:
    determining a position error signal for a first sector by reading a first servo bit;
    determining a position error signal for a second sector by reading a second servo bit;
    identifying said first sector as having a first defect type where an amplitude of the burst signal for said first servo bit differs from a reference amplitude by more than a threshold amount, said reference amplitude being a function of said amplitude of said first servo bit and an amplitude of said second servo bit; and;
    identifying a second defect type where a first rate of change of the position error signals between said first sector and second sector exceeds a predetermined rate.

2. The method of claim 1, further comprising reading the first servo bit a plurality of times and determining said amplitude for the first sector, said amplitude to be the sum of the burst signals of the first servo bit for said first sector for the plurality of times said first servo bit is read, divided by the number of times said first servo bit is read.

3. The method of claim 1, where identifying a second defect type comprises, determining the position error signals for each of the first and second sectors, determining the first rate of change of the position error signals for the first and second sectors, determining if the first rate of change is greater than the predetermined rate and, if so, providing a compensation signal to the position error signals for the first and second sectors.

4. The method of claim 3, further comprising:
    determining a position of a head adjacent to said surface using the burst signals provided by the first and second servo bits where said first rate of change is greater than the predetermined rate.

5. The method of claim 4, further comprising:
    determining an adjusted position signal, said adjusted position signal being a function of the position error signals of said first and second sectors and the compensation signal, said adjusted position signal having a second rate of change across the first and second sectors which is less than said first rate of change.

6. The method of claim 1, further comprising identifying said first sector as having a third defect type where a fault frequency of said burst signal for said first sector is greater than a threshold frequency.

7. The method of claim 6, wherein identifying said first sector as having a third defect type comprises, determining position error signals for the first sector for a plurality of readings, determining the fault frequency of the burst signals for the first sector by comparing the position error signals of the plurality of readings to a reference position signal, comparing the fault frequency to a threshold frequency, and identifying the first sector as abnormal where said fault frequency is greater than the threshold frequency.

8. The method of claim 7 wherein determining said fault frequency comprises generating, for each of said plurality of readings, a position error signal based on the burst signal of the first servo bit, identifying a fault for each of the plurality of readings where the position error signal exceeds the reference position signal, and dividing said number of faults by said plurality of readings.

9. The method of claim 7, further comprising:
    mapping said first sector as defective and disabling a write gate for the first sector.

10. A hard disk drive, comprising:
    a housing;
    an actuator arm mounted to said housing;
    a head mounted to said actuator arm;
    a disk attached to a spin motor, said disk having a plurality of tracks, each of said tracks having a sector with a servo bit, each of said servo bits to provide a burst signal when read by the head; and
    a controller coupled to the head to:
    determine a position error signal for a first sector by reading a first servo bit,
    determine a position error signal for a second sector by reading a second servo bit,
    identify said first sector as having a first defect type where an amplitude of the burst signal for said first servo bit differs from a reference amplitude by more than a threshold amount, said reference amplitude being a function of said amplitude of said first servo bit and an amplitude of said second servo bit, and,
    identify a second defect type where a first rate of change of the position error signals between said first sector and second sector exceeds a predetermined rate.

11. The hard disk drive of claim 10, wherein said controller is further to: read the first servo bit a plurality of times and determine said amplitude for the first sector, said amplitude to be the sum of the burst signals of the first servo bit for said first sector for the plurality of times said first servo bit is read, divided by the number of times said first servo bit is read.

12. The hard disk drive of claim 10, wherein to identify said second defect type, said controller determines the position error signals for each of the first and second sectors, determines the first rate of change of the position error signals for the first and second sectors, determines if the first rate of change is greater than the predetermined rate and, if so, provides a compensation signal to the position error signals for the first and second sectors.

13. The hard disk drive of claim 12, wherein said controller is to further:
    determine a position of a head adjacent to said surface using the burst signals provided by the first and second servo bits where said first rate of change is greater than the predetermined rate; and,
    determine an adjusted position signal, said adjusted position signal being a function of the position error signals of said first and second sectors and the compensation signal, said adjusted position signal having a second rate of change across the first and second sectors which is less than said first rate of change.

14. The hard disk drive of claim 10, wherein said controller identifies said first sector as having a third defect type where a fault frequency of said burst signal for said first sector is greater than a threshold frequency.

15. The hard disk drive of claim 14, wherein to identify said first sector as having a third defect type, said controller: determines position error signals for the first sector for a plurality of readings, determines the fault frequency of the burst signals for the first sector by comparing the position error signals of the plurality of readings to a reference position signal, compares the fault frequency to a threshold frequency, and identifies the first sector as abnormal where said fault frequency is greater than the threshold frequency.

16. The hard disk drive of claim 15 wherein to determine said fault frequency, said controller generates, for each of said plurality of readings, a position error signal based on the burst signal of the servo bit, identifies a fault for each of the plurality of readings where the position error signal exceeds the reference position signal, and divides said number of faults by said plurality of readings.

17. A hard disk drive, comprising:
    a housing;
    an actuator arm mounted to said housing;
    a head mounted to said actuator arm;
    a disk attached to a spin motor, said disk having a plurality of tracks, each of said tracks having a sector with a servo bit, each of said servo bits to provide a burst signals when read by the head; and
    a controller coupled to the head to determine position error signals for a sector for each of a plurality of readings, to determine a fault frequency for the sector by comparing the position error signals of the plurality of readings to a reference position signal, to compare the fault frequency to a threshold frequency, and to identify the sector as abnormal when the fault frequency is greater than the threshold frequency wherein said fault frequency is determined by generating, for each of said plurality of readings, a position error signal based on the burst signal of the servo bit, identifying a number of faults over the plurality of readings where said write faults are characterized by the position error signal exceeding the reference position signal, and dividing said number of write faults by said plurality of readings.

18. The hard disk drive of claim 17, wherein said position error signal is a function of a difference between an expected head position and an actual head position.

19. The hard disk drive of claim 17, wherein the threshold frequency is between 0.5 and 0.75.

20. The hard disk drive of claim 17, wherein identifying said sector as abnormal comprises mapping the sector as defective.

21. The hard disk drive of claim 20, wherein mapping the sector as defective further comprises disabling a write gate for the sector.

22. The hard disk drive of claim 17, wherein the controller further maps said sector as a virtual servo defect when the write fault frequency is greater than the threshold frequency, where mapping said sector as a virtual servo defect includes disabling a write gate for the sector and using the burst signal provided by the servo bit of the sector to determine a position signal.

23. A method of detecting a defect on a surface of a disk having a plurality of tracks, each of said tracks having a sector, said sector having a servo bit, said servo bit to provide a burst signal when read by the head, comprising:

determining position error signals for the sector for each of a plurality of readings;

determining a fault frequency for the sector by comparing the position error signals of the plurality of readings to a reference position signal wherein determining a fault frequency comprises;

generating, for each of said plurality of readings, a position error signal based on the burst signal of the servo bit;

identifying a number of faults over the plurality of readings where said faults are characterized by the position error signal exceeding the reference position signal; and dividing said number of faults by said plurality of readings;

comparing the fault frequency to a threshold frequency, and, identifying the sector as abnormal when the fault frequency is greater than the threshold frequency.

24. The method of claim 23, wherein determining position error signals comprises determining position error signals where said position error signals are a function of a difference between an expected head position and an actual head position.

25. The method of claim 23, wherein identifying the sector as abnormal comprises identifying the sector as abnormal when the fault frequency is greater than the threshold frequency, said threshold frequency to be between 0.5 and 0.75.

26. The method of claim 23, wherein identifying said sector as abnormal comprises mapping the sector as defective.

27. A method of detecting a plurality of defect types on a surface of a disk having a plurality of tracks, each track having a sector with a servo bit to provide a burst signal when read, comprising:

determining a position error signal for a first sector by reading a first servo bit;

determining a position error signal for a second sector by reading a second servo bit;

identifying said first sector as having a first defect type where an amplitude of the burst signal for said first servo bit differs from a reference amplitude by more than a threshold amount;

identifying a second defect type where a first rate of change of the position error signals between said first sector and second sector exceeds a predetermined rate;

providing a compensation signal to the position error signals for the first and second sectors; and, determining a position of a head adjacent to said surface using the burst signals provided by the first and second servo bits where said first rate of change is greater than the predetermined rate.

28. The method of claim 27, further comprising reading the first servo bit a plurality of times and determining said amplitude for the first sector, said amplitude to be the sum of the burst signals of the first servo bit for said first sector for the plurality of times said first servo bit is read, divided by the number of times said first servo bit is read.

29. The method of claim 27, further comprising:

determining an adjusted position signal, said adjusted position signal being a function of the position error signals of said first and second sectors and the compensation signal, said adjusted position signal having a second rate of change across the first and second sectors which is less than said first rate of change.

30. The method of claim 27 wherein determining said fault frequency comprises generating, for each of said plurality of readings, a position error signal based on the burst signal of the first servo bit, identifying a fault for each of the plurality of readings where the position error signal exceeds the reference position signal, and dividing said number of faults by said plurality of readings.

31. The method of claim 27, further comprising:

mapping said first sector as defective and disabling a write gate for the first sector.

32. A hard disk drive, comprising:

a housing;

an actuator arm mounted to said housing;

a head mounted to said actuator arm;

a disk attached to a spin motor, said disk having a plurality of tracks, each of said tracks having a sector with a servo bit, each of said servo bits to provide a burst signal when read by the head; and a controller coupled to the head to:

determine a position error signal for a first sector by reading a first servo bit, determine a position error signal for a second sector by reading a second servo bit, identify said first sector as having a first defect type where an amplitude of the burst signal for said first servo bit differs from a reference amplitude by more than a threshold amount, identify a second defect type where a first rate of change of the position error signals between said first sector and second sector exceeds a predetermined rate provide a compensation signal to the position error signals for the first and second sectors, and determine a position of a head adjacent to said surface using the burst signals provided by the first and second servo bits where said first rate of change is greater than the predetermined rate; and, determine an adjusted position signal, said adjusted position signal being a function of the position error signals of said first and second sectors and the compensation signal, said adjusted position signal having a second rate of change across the first and second sectors which is less than said first rate of change.

33. The hard disk drive of claim 32, wherein said controller is further to: read the first servo bit a plurality of times and determine said amplitude for the first sector, said amplitude to be the sum of the burst signals of the first servo bit for said first sector for the plurality of times said first servo bit is read, divided by the number of times said first servo bit is read.

34. The hard disk drive of claim 32 wherein to determine said fault frequency, said controller generates, for each of said plurality of readings, a position error signal based on the burst signal of the servo bit, identifies a fault for each of the plurality of readings where the position error signal exceeds the reference position signal, and divides said number of faults by said plurality of readings.

* * * * *